No. 787,116. PATENTED APR. 11, 1905.
H. SCHLUETER.
DEVICE FOR THE BREAKING IN OF HORSES.
APPLICATION FILED AUG. 29, 1904.
2 SHEETS—SHEET 1.
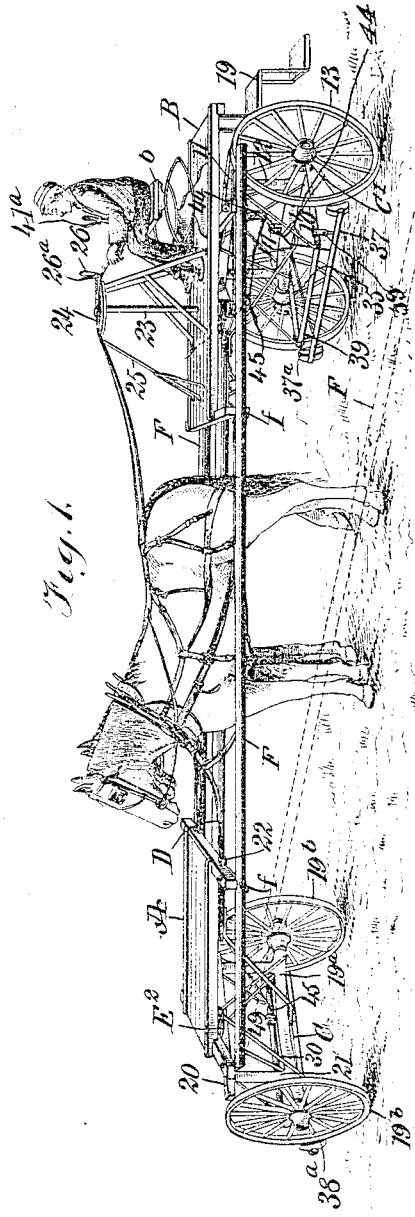
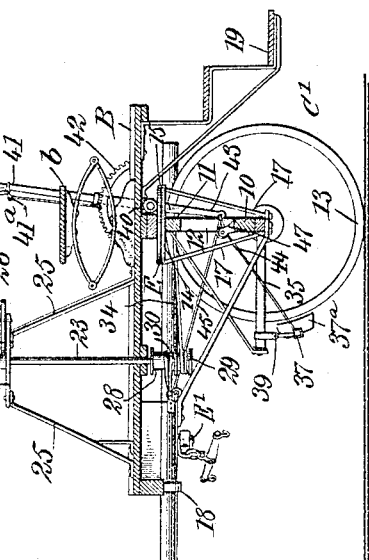
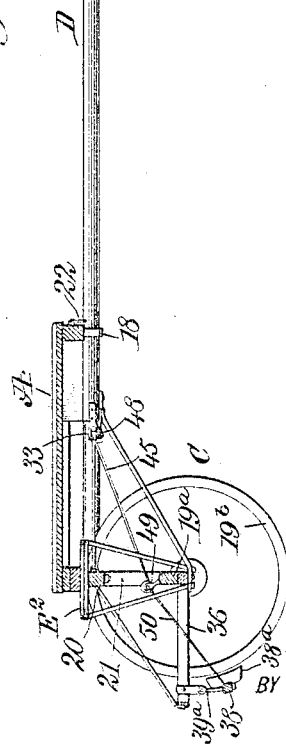
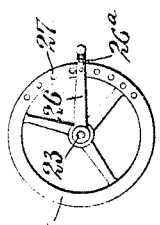
WITNESSES:
INVENTOR
Henry Schlueter
BY
ATTORNEYS No. 787,116. PATENTED APR. 11, 1905.
H. SCHLUETER.
DEVICE FOR THE BREAKING IN OF HORSES.
APPLICATION FILED AUG. 29, 1904.
2 SHEETS—SHEET 2.
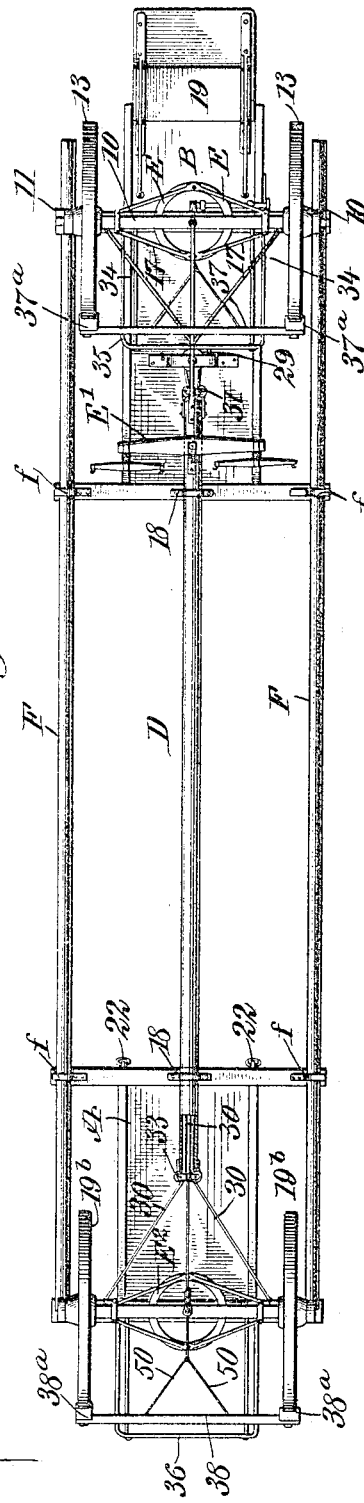
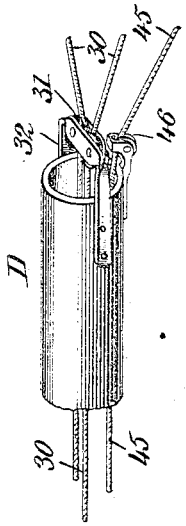
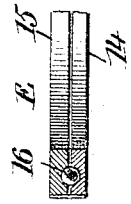
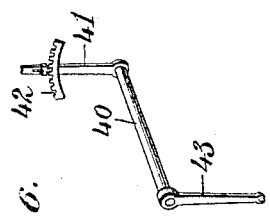
WITNESSES:
INVENTOR
Henry Schlueter
BY
ATTORNEYS No. 787,116. Patented April 11, 1905.

UNITED STATES PATENT OFFICE.

HENRY SCHLUETER, OF SCRIBNER, NEBRASKA.

DEVICE FOR THE BREAKING IN OF HORSES.

SPECIFICATION forming part of Letters Patent No. 787,116, dated April 11, 1905.

Application filed August 29, 1904. Serial No. 222,556.

*To all whom it may concern:*

Be it known that I, HENRY SCHLUETER, a citizen of the United States, and a resident of Scribner, in the county of Dodge and State of Nebraska, have invented a new and Improved Device for the Breaking in of Horses, of which the following is a full, clear, and exact description.

The purpose of the invention is to provide a simple and readily-controllable vehicle especially adapted for breaking in colts or wild horses to harness, the arrangement of the vehicle being such as to accommodate one or two unbroken animals only or one or two unbroken animals together with one or two animals previously broken to harness.

A further purpose of the invention is to provide means within convenient reach of the driver whereby to conveniently steer the vehicle or manipulate the brakes simultaneously with reference to the front and rear trucks as conditions may require.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved vehicle used for breaking-in purposes. Fig. 2 is a longitudinal section through the vehicle, taken at a point near the center. Fig. 3 is a bottom plan view of the improved vehicle. Fig. 4 is a perspective view of a portion of the reach-tube connecting the forward and rear portions of the vehicle. Fig. 5 is a section through one of the fifth-wheels. Fig 6 is a perspective view of the lever and shaft employed in connection with the brakes for the wheels, and Fig. 7 is a detail view of the steering-shaft and the guide and locking mechanism therefor.

A represents the front platform of the vehicle, and B the rear platform, as two platforms are employed. These two platforms are connected by a tube D, which is centrally located with respect to the platforms and extends beneath them, as is best shown in Fig. 2.

C represents the forward truck, and C' the rear truck, of the vehicle, the trucks being located beneath the platforms A and B.

The rear platform B is provided with a driver's seat *b*, as is shown in Figs. 1 and 2, located usually at the rear portion of the rear truck C', and this rear truck consists of an axle 10, an upper cross-bar 11, and standards 12, connecting the axle with the said upper cross-bar, together with wheels 13, suitably mounted on the axle 10.

A fifth-wheel E is made to intervene between the rear platform B and the rear truck C', the lower member 14 of the said fifth-wheel being secured to the upper cross-bar 11 of the rear truck, and the upper member 15 of the said fifth-wheel is secured to the under surface of the said rear platform. Between the two members 14 and 15 of the said fifth-wheel ball-bearings 16 are located, as is shown in Fig. 5. The lower member 14 of the rear fifth-wheel E is preferably supported by brace-bars 17, attached to the said member and having a secure connection with the axle 10.

The central connecting-tube D, which acts in the nature of a reach, is secured to the two platforms A and B by means of suitable straps 18, and usually at the rear of the rear platform B steps 19 are located, enabling the driver or trainer to gain ready access to the seat *b*.

Beneath the forward portion of the rear platform B a draft-tree E' is located, which draft-tree is preferably a double draft-tree, although it may be removed and a swingletree substituted, if desired.

The forward truck C consists of an axle 19ª, having suitable wheels 19ᵇ mounted thereon, and uprights 21, leading from the axle, while an upper cross-bar 20 is secured to the said uprights. A fifth-wheel E², corresponding in construction and position to the fifth-wheel E on the rear truck, is likewise employed, the lower member of the said fifth-wheel being supported from the axle or located on the upper cross-bar 20, and the upper member is attached to the under face of the rear of the platform A, and at the rear end of the said forward platform A rings or their equivalents 22 are located.

Side rails or bars F are employed, which side bars or rails are pivoted usually to the forward cross-bar of the forward platform A, one at each side of the said platform, and these side rails or bars F are carried rearward and are supported by suitable clips $f$, attached to the end portions of the rear cross-bar of the forward platform A and the end portions of the forward cross-bar of the rear platform B and a rear cross-bar provided for the said rear platform, as is shown in Figs. 1 and 3.

A shaft 23 is journaled vertically in the rear platform B in front of the trainer's or driver's seat $b$, and this shaft at its upper end is mounted to turn in a spider 24, which spider is supported by suitable braces 25, attached to the said rear platform, as is shown in Figs. 1 and 2. A crank-arm 26 is secured to the upper end of the shaft 23 above the said spider 24, which crank-arm may be readily grasped by the trainer, and the crank-arm is provided with a thumb-latch $26^a$, adapted to enter any one of a series of apertures 27 in the peripheral portion of the said spider-guide 24.

The parts just mentioned constitute a portion of the steering mechanism, and the shaft 23 is provided with two adjacent drums 28 and 29 at its bottom portion, or that portion which is below the platform B, the drum 29 being the lower one, and a cable 30 is wound around the upper drum 28, as is best shown in Fig. 4, and this cable is passed in two strands over guide-pulleys 31, supported in a yoke 32 at the rear end of the tubular reach D, and the strands of the cable are then passed through the said reach over guide-pulleys 33 at the forward end of the reach and the ends of the cable are secured to the forward axle $19^a$ near each extremity thereof. A second cable 34 is wound around the lower drum 29, and the ends of this cable 34 are attached to the rear axle 10 near the rear extremities of the same, so that by moving the crank-arm 26 in one direction the rear wheels will be turned to the right and the forward wheels to the left, and when the said crank-arm is moved in an opposite direction the forward wheels will be moved to the right and the rear wheels to the left, thus enabling the vehicle to be guided in a circle when desired.

The horses to be trained are placed one, for example, at each side of the reach D, the side bars F being then dropped downward to the position shown in dotted lines in Fig. 1, and when the animals are in position the side bars are again engaged with the clips $f$. The harness is then connected in the usual way with the draft-tree E', and straps are likewise employed to connect the collars at their bottom portions with the eyes 22 on the forward platform A, as is shown in Fig. 1.

It will be understood that the vehicle may be made sufficiently large to accommodate, for example, two animals to be broken in and two animals that have already been broken, or the vehicle may be made only sufficiently large to accommodate one animal or two animals to be subjected to the breaking-in process.

With reference to the trucks and the device for simultaneously applying brake-shoes to the wheels of both the forward and the rear trucks, the rear truck is provided with a horizontal forwardly-extending yoke 35, attached to the axle 10, and the forward truck is provided with a corresponding yoke 36, extending forwardly from its axle $19^a$. A brake-bar 37 is suspended by links 39 from the yoke 35, and this brake-bar 37 is provided with brake-shoes $37^a$, which engage the periphery of the wheels of the rear truck C', while the wheels of the forward truck C are engaged by brake-shoes $38^a$, which are secured to the forward brake-bar 38, suspended from the forward yoke 36 by suitable links $39^a$.

A shaft 40 is journaled beneath the rear platform B above the rear fifth-wheel E, and at one end of this shaft 40 an upwardly-extending lever 41 is secured, provided with a thumb-latch $41^a$, which is adapted for engagement with the teeth of the rack 42, located on the rear platform B. This lever 41 is within convenient reach of the trainer when seated. At the opposite end of the shaft 40 a downwardly-extending crank-arm 43 is secured, and a cable or chain 44 is secured to the lower end of this crank-arm 43 and is passed under a pulley 47, carried by the axle to an engagement at its ends with the brake-bar 37, so that when the lever 41 is moved in one direction the brake-shoes $37^a$ will be brought in engagement with the wheels of the rear truck C'. Another cable, 45, is likewise secured to the lower end of the crank-arm 43, and this cable 45, as is shown in Figs. 2 and 4, passes over guide-pulleys 46 at the rear end of the reach-tube D and through the tube to its forward end, where said cable 45 passes over a friction-pulley 48 and in engagement with a pulley 49, secured to the forward axle $19^a$. The forward end of this cable 45 is provided with a bifurcated section 50, and the extremities of the bifurcated section 50 of the cable are secured to the forward brake-bar 38, so that as the lever 41 is moved to fix the brake-shoes against the wheels of the rear truck C' the brake-shoes for the forward brake will be brought simultaneously in engagement with the wheels of that truck.

It will be observed that a vehicle constructed as described is under the complete control of the driver or trainer, and that the animals are held in harness and cannot rear or kick to any great extent, and that they are compelled in moving to carry the vehicle with them, and that the vehicle may be expeditiously and conveniently steered in any desired direction or in a circle when desired, so that the training may take place in a comparatively small space. Furthermore, the brakes are always at the command of the driver or trainer and will act simultaneously with respect to both the front and the rear wheels. As both of the trucks are provided with roller-bearing fifth-wheels the vehicle may be turned in a small space and will operate with the least possible amount of friction.

Having thus described my invention, I claim as new and desire to secure by Letters Patent—

1. In a device for breaking in horses, a vehicle comprising a forward and a rear truck, platforms supported by the trucks, fifth-wheels connecting the trucks with their platforms, a reach connecting the platforms, and steering and brake devices for the trucks, operated from one of the platforms and guided in operation by the reach.

2. In a device for breaking in horses, a vehicle comprising a forward and a rear truck, platforms supported by the same, fifth-wheel connections between the trucks and their platforms, a tubular reach connecting the platforms, and steering and brake devices operated from one platform, the tubular reach serving as a conductor for said devices, as described.

3. In a device for breaking in horses, a vehicle comprising a forward and a rear truck, platforms supported by the fifth-wheel connection between the trucks and their platforms, a tubular reach connecting the platforms, a steering-shaft carried by the rear platform, a combined regulating and operating device for the said shaft, cable connections between the shaft and the trucks, passing through the said reach and arranged to simultaneously turn the trucks in opposite directions, as described.

4. In a device for breaking in horses, a vehicle comprising a forward and a rear truck, platforms supported by the fifth-wheel connections between the trucks and their platforms, a tubular reach connecting the platforms, a steering-shaft carried by the rear platform, a combined regulating and operating device for the said shaft, cable connections between the shaft and the trucks, passing through the said reach and arranged to simultaneously turn the trucks in opposite directions, a shaft mounted below the rear truck, a lever extending upward from the shaft, a crank-arm also connected with the said shaft, brake-bars for the wheels of the forward and rear trucks, and cables connected with the said crank-arm and with the said brake-bars, the cable for the forward truck being passed through the said reach, as described.

5. In a device for breaking in horses, a forward and a rear truck, platforms having fifth-wheel connections with each truck, a reach connecting the said platforms at their central portions and side bars pivoted to one platform and having detachable connection with the opposite platform, a draft-tree carried by the rear platform, and devices carried by the forward platform, whereby to attach portions of a harness, as described.

6. In a device for breaking in horses, a forward and a rear truck, platforms having fifth-wheel connections with each truck, a reach connecting said platforms at their central portions, and side bars pivoted to one platform and having detachable connection with the opposite platform, a draft-tree carried by the rear platform, and devices carried by the forward platform whereby to attach portions of a harness, a steering mechanism acting simultaneously upon the forward and rear trucks to turn them in opposite directions, brakes for the wheels of the trucks, and a mechanism for operating the said brakes, as and for the purpose specified.

7. In a device for breaking in horses, a forward and a rear truck, platforms above the two trucks, fifth-wheel connections between the trucks and the platforms, a shaft vertically mounted in the rear platform and provided with two drums at its lower end, a spider-guide for the upper portion of the shaft, having a series of apertures therein, a crank-handle for the upper portion of the shaft, a thumb-latch carried by the said handle and adapted to enter any one of the said apertures, a cable carried by the upper drum, connected with the axle of the forward truck, and a cable carried by the lower drum connected with the axle of the rear truck, as set forth.

8. In a device for breaking in horses, a forward and a rear truck, platforms above the two trucks, fifth-wheel connections between the trucks and the platforms, a shaft vertically mounted in the rear platform and provided with two drums at its lower end, a spider-guide for the upper portion of the shaft, having a series of apertures therein, a crank-handle for the upper portion of the shaft, a thumb-latch carried by the said handle and adapted to enter any one of the said apertures, a tubular reach connecting the platforms, guide-pulleys at the ends of the reach, a cable coiled around the upper drum, which cable is passed through the said reach in engagement with the said friction-rollers, the ends of the said cable being attached to the axle of the forward truck near the ends of the axle, and an independent cable wound around the lower drum, the ends whereof are carried to an engagement with the axle of the rear truck near the ends of the said axle, as described.

9. In a device for breaking in horses, a vehicle consisting of a forward and a rear truck, a platform over each truck, roller-bearing fifth-wheels connecting the trucks with the platforms above them, a shaft journaled beneath the rear platform, a handle extending upward from the shaft, a thumb-latch for the handle, and a rack to receive the thumb-latch carried by the said platform, a crank-arm extending downward from the said shaft, supports carried forwardly from the axles of the trucks, brake-bars adjustably suspended from the said supports, brake-shoes for the wheels, carried by the brake-bar, a cable connected with the lower portion of the said crank-arm, having connection with the brake-bars of the forward truck, and a second cable likewise attached to the lower portion of the said crank-arm, having connection with the brake-bar for the rear truck, all operating substantially in the manner specified.

In testimony whereof I have signed my name to this specification in the presence of two subscribing witnesses.

HENRY SCHLUETER.

Witnesses:
    OTTO SCHLÜTER,
    HENRY M. KIDDER.